(12) United States Patent  
Farina

(10) Patent No.: US 9,488,349 B2  
(45) Date of Patent: Nov. 8, 2016

(54) WEARABLE SAFETY LIGHT ASSEMBLY

(71) Applicant: Paul Farina, Surrey (CA)

(72) Inventor: Paul Farina, Surrey (CA)

( * ) Notice: Subject to any disclaimer, the term of this patent is extended or adjusted under 35 U.S.C. 154(b) by 0 days.

(21) Appl. No.: 14/608,671

(22) Filed: Jan. 29, 2015

(65) Prior Publication Data

US 2016/0223170 A1   Aug. 4, 2016

(51) Int. Cl.
| | |
|---|---|
| *F21V 21/08* | (2006.01) |
| *F21V 33/00* | (2006.01) |
| *F21L 4/00* | (2006.01) |
| *H04N 5/232* | (2006.01) |
| *H04N 5/225* | (2006.01) |
| *F21V 15/01* | (2006.01) |
| *F21V 23/04* | (2006.01) |

(52) U.S. Cl.
CPC ............... *F21V 21/08* (2013.01); *F21L 4/00* (2013.01); *F21V 15/01* (2013.01); *F21V 23/0414* (2013.01); *F21V 33/0052* (2013.01); *F21V 33/0076* (2013.01); *H04N 5/2251* (2013.01); *H04N 5/2256* (2013.01); *H04N 5/23241* (2013.01)

(58) Field of Classification Search
None
See application file for complete search history.

(56) References Cited

U.S. PATENT DOCUMENTS

| | | | |
|---|---|---|---|
| 1,568,528 A | 1/1926 | Petrie | |
| 4,977,614 A * | 12/1990 | Kurcbart | A44C 5/00 340/7.63 |
| 5,124,898 A * | 6/1992 | Chabria | F21L 7/00 116/3 |
| 5,517,180 A * | 5/1996 | Masi | G08B 15/004 222/613 |
| 5,611,615 A * | 3/1997 | Jang | A63B 29/08 362/109 |
| 5,816,688 A * | 10/1998 | Shui-Shang | F21L 4/005 362/187 |
| 5,848,834 A * | 12/1998 | Kerr | F21L 15/14 362/110 |
| 6,398,383 B1 * | 6/2002 | Huang | F21L 4/005 362/197 |
| 6,857,771 B2 * | 2/2005 | Guerrieri | G02B 6/001 362/184 |
| 6,877,878 B2 * | 4/2005 | Raskas | H04N 5/2256 348/E5.029 |
| 6,942,362 B1 * | 9/2005 | Deutsch | B60Q 1/326 362/116 |
| 6,975,213 B2 | 12/2005 | Wang | |
| D598,314 S | 8/2009 | Ingerman | |
| 7,845,820 B2 * | 12/2010 | Bertken | F21L 4/02 362/120 |
| D672,483 S | 12/2012 | Tedesco | |
| 8,348,465 B2 * | 1/2013 | Schrimmer | F21L 4/027 362/120 |
| 8,424,350 B2 | 4/2013 | Bernatchez | |
| 8,474,994 B2 | 7/2013 | Campman | |
| 8,529,087 B2 | 9/2013 | Bertken | |
| 2004/0112198 A1 * | 6/2004 | Goodman | G10G 7/00 84/398 |
| 2005/0211284 A1 * | 9/2005 | Dooley | A45B 3/00 135/65 |
| 2007/0047223 A1 | 3/2007 | Mundhra et al. | |
| 2008/0192459 A1 * | 8/2008 | Kwok | A61B 5/1116 362/105 |
| 2010/0080087 A1 | 4/2010 | Shupp | |

* cited by examiner

*Primary Examiner* — Albert Cutler

(57) ABSTRACT

A wearable safety light assembly includes a housing having a front end, a back end and a perimeter wall attached to and extending between the front and back ends. The front end is open and the perimeter wall includes a bottom side and a top side. A light emitter is mounted in the housing and is directed outwardly through the front end. A power supply is mounted in the housing and is in electrical communication with the light emitter. A light actuator is mounted on the housing and is electrically coupled to the light emitter. The light actuator is actuated to turn the light emitter on or off. A whistle is attached to the housing. A finger mount is attached to the housing and engages one or two fingers of a person such that the housing is positioned on an upper side of the fingers.

7 Claims, 4 Drawing Sheets

WEARABLE SAFETY LIGHT ASSEMBLY

BACKGROUND OF THE DISCLOSURE

Field of the Disclosure

The disclosure relates to personal light emitter devices and more particularly pertains to a new personal light emitter device for positioning on a person's fingers to allow the person to illuminate objects or persons during times of low illumination.

SUMMARY OF THE DISCLOSURE

An embodiment of the disclosure meets the needs presented above by generally comprising a housing having a front end, a back end and a perimeter wall attached to and extending between the front and back ends. The front end is open and the perimeter wall includes a bottom side and a top side. A light emitter is mounted in the housing and is directed outwardly through the front end. A power supply is mounted in the housing and is in electrical communication with the light emitter. A light actuator is mounted on the housing and is electrically coupled to the light emitter. The light actuator is actuated to turn the light emitter on or off. A whistle is attached to the housing. A finger mount is attached to the housing and engages one or two fingers of a person such that the housing is positioned on an upper side of the fingers.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
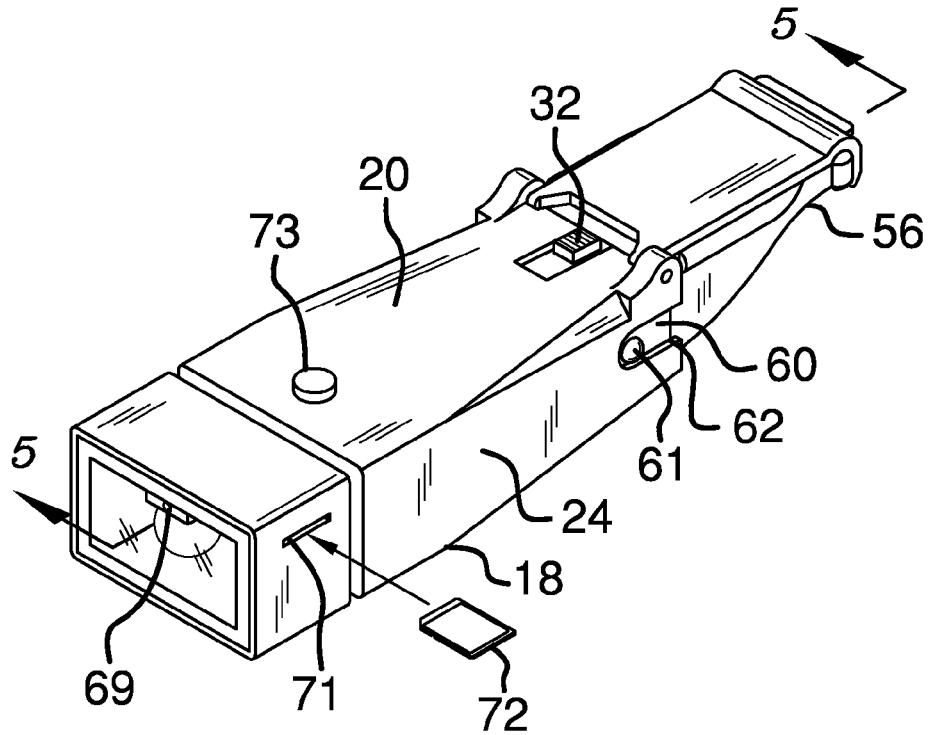
FIG. 1 is a top perspective view of a wearable safety light assembly according to an embodiment of the disclosure having a finger mount thereof removed.
Figure 2:
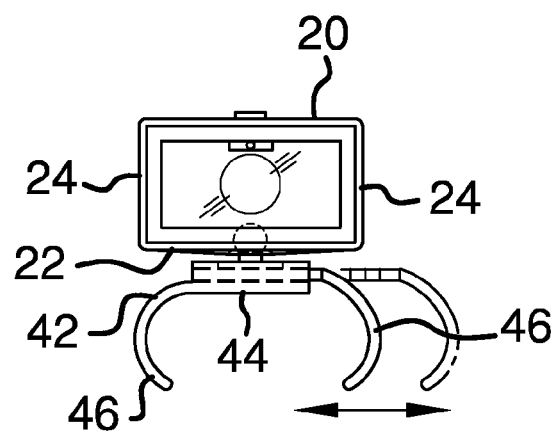
FIG. 2 is a front view of an embodiment of the disclosure.
Figure 3:
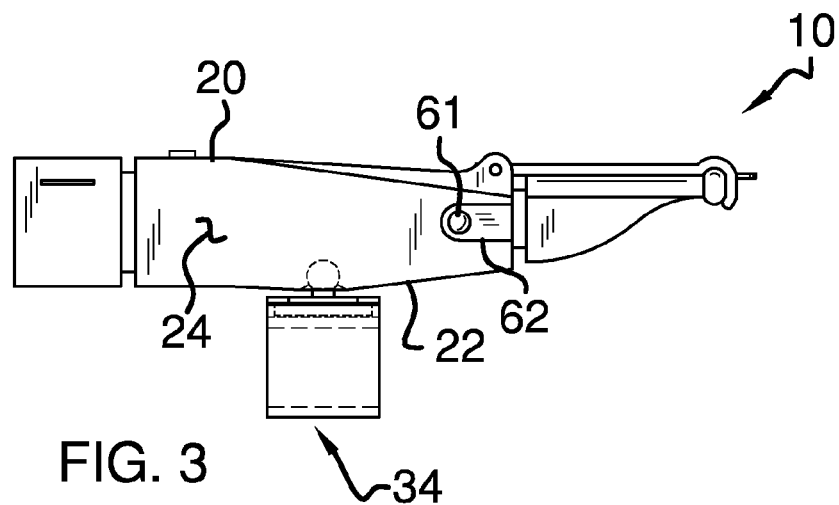
FIG. 3 is a side view of an embodiment of the disclosure.

With reference now to the drawings, and in particular to FIGS. 1 through 8 thereof, a new personal light emitter device embodying the principles and concepts of an embodiment of the disclosure and generally designated by the reference numeral 10 will be described.

As best illustrated in FIGS. 1 through 8, the wearable safety light assembly 10 generally comprises a housing 12 that has a front end 14, a back end 16 and a perimeter wall 18 that is attached to and extends between the front 14 and back 16 ends. The front end 14 is open and may be substantially open such that only the perimeter wall 18 bounds the front end 14. The perimeter wall 18 includes a bottom side 20 and a top side 22 and may have a rectangular cross-section such that a pair of lateral sides 24 is also defined. The housing 12 may have a length from the front end 14 to the back end 16 being less than 5.0 inches and a height and width each is less than 2.0 inches.

A light emitter 26 is mounted in the housing 12 and is directed outwardly through the front end 14. The light emitter 26 may be a conventional incandescent bulb or a light emitting diode. A power supply 28 is mounted in the housing 12 and is in electrical communication with the light emitter 26. The power supply 28 may comprise a battery 30. A light actuator 32 is mounted on the housing 12 and is electrically coupled to the light emitter 26. The light actuator 32 is actuated to turn the light emitter 26 on or off and may be positioned on the top side 20. The front end 14 may be part of a head of the housing 12 which is removable to access the light emitter 26 and battery 30 for replacement.

A finger mount 34 is attached to the housing 12 and is configured to engage one or two fingers 36 of a person such that the housing 12 is positioned on an upper side of the fingers 36. A coupler 38 is attached to and extends upwardly from the finger mount 34. The coupler 38 may rotatably couple the housing 12 to the finger mount 34 so that the front end 14 may be directed where desired relative to the person's fingers 36. The coupler 36 may, in particular, comprise a ball mount that releasably engages the bottom side 22 of the housing 12. The housing 12 may therefore include a saddle 40 for receiving the ball mount, or coupler 36, and the ball mount may be removed from the saddle 40 as desired.

Figure 7:
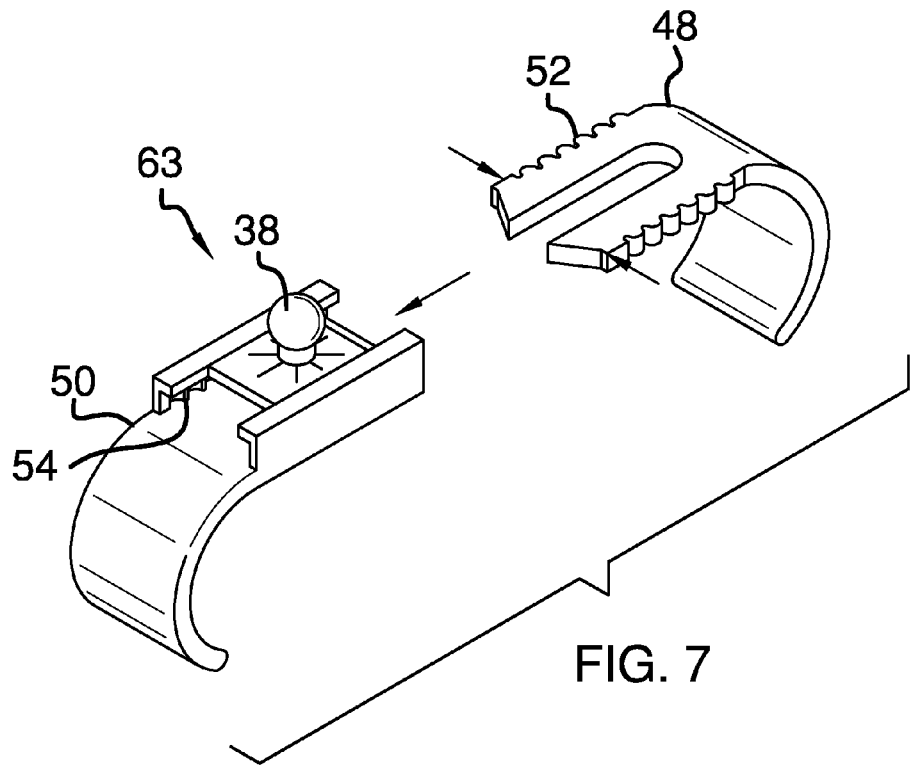
FIG. 7 is an exploded perspective view of an embodiment of the disclosure of the finger mount.
Figure 8:
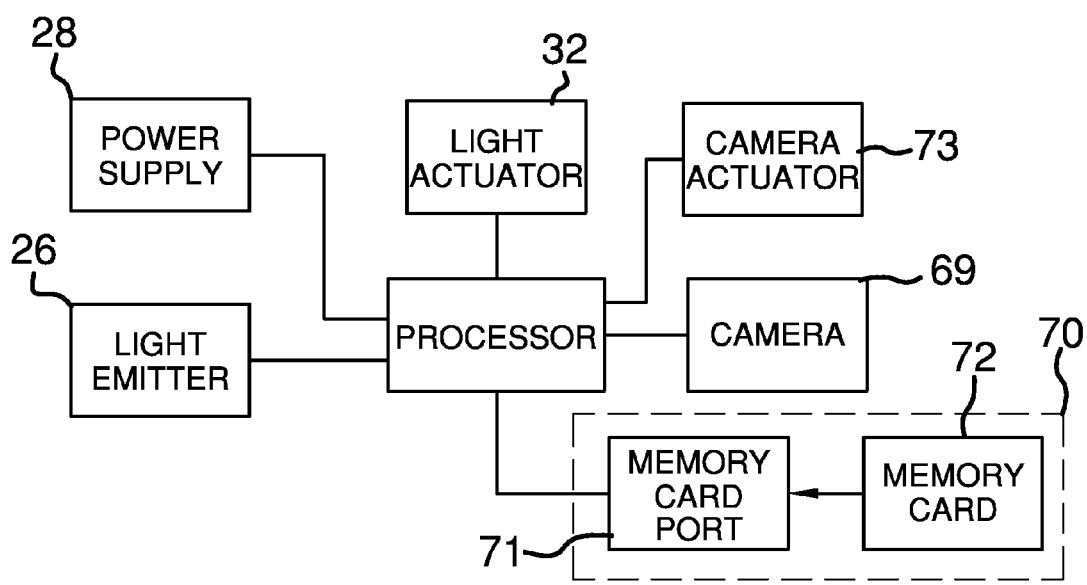
FIG. 8 is a schematic view of an embodiment of the disclosure.

The finger mount 34 may include a band 42 with a central wall 44 and a pair of lateral walls 46 is attached to and extending downwardly from the central wall 44. The lateral walls 46 are arcuate and curve toward each other to at least form a partial loop, though a full, closed loop may be utilized. The central wall 44 may have a break therein to define a first section 48 and a second section 50 of the central wall 44. The first 48 and second 50 sections are slidably coupled together to selectively alter a distance between the lateral walls 46. As shown in FIG. 7, the first 48 and second 50 sections may include first 52 and second 54 mating members to allow the first 48 and second 50 sections to be locked at a desired point relative to each other. The first 52 and second 54 mating members may comprise interlocking teeth.

Figure 4:
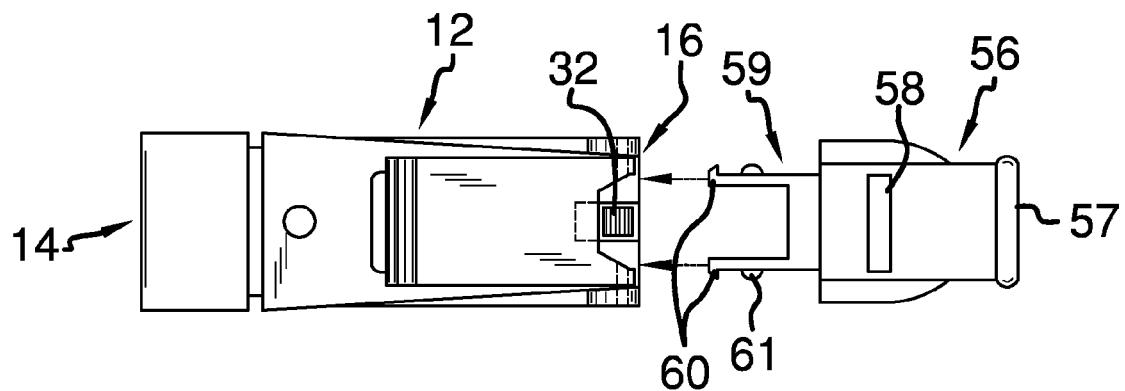
FIG. 4 is a top view of an embodiment of the disclosure having the finger mount removed.
Figure 5:
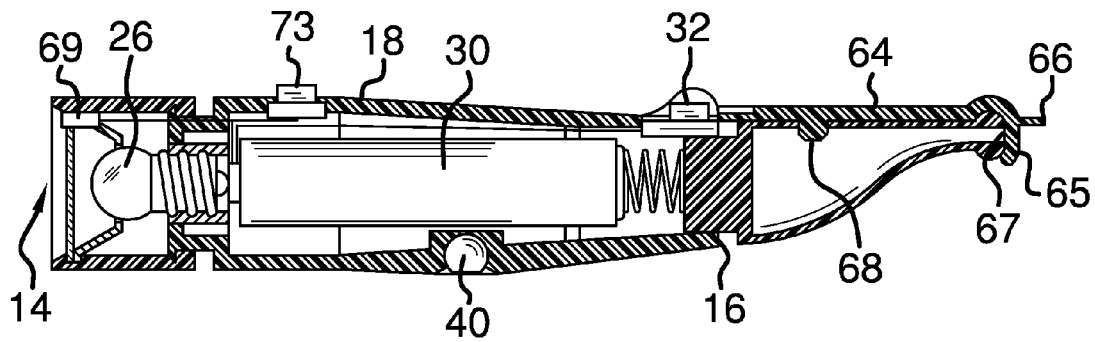
FIG. 5 is a cross-sectional view of an embodiment of the disclosure taken along line 5-5 of FIG. 1.
Figure 6:
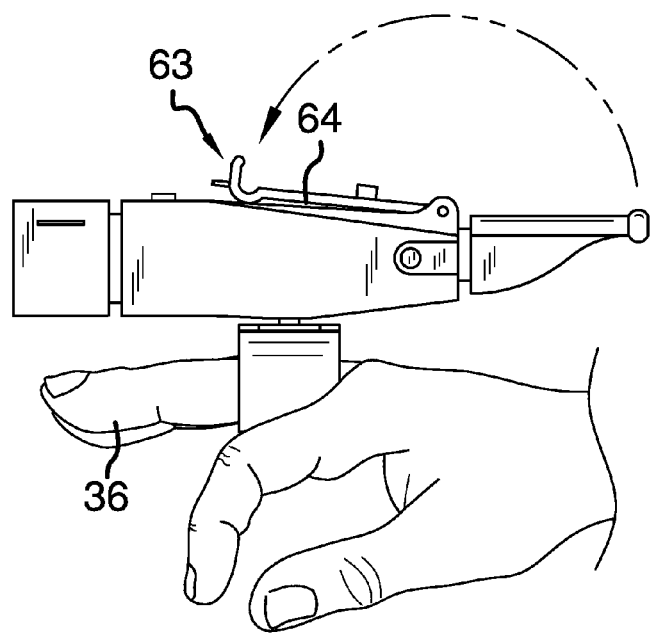
FIG. 6 is a side in-use view of an embodiment of the disclosure.

A whistle 56 is attached to the housing 12 and includes a mouthpiece 57 extending rearwardly from the back end 16 of the housing 12. The whistle 56 may be generally conventional and include an exhaust opening 58 in an upper side of the whistle 56. The whistle 56 may be removable from the housing 12 as shown in FIG. 4. The whistle 56 may include an attachment member 59 to releasably engage the housing 12. FIG. 4 shows an attachment member 59 including a pair of legs 60 each having a detent 61 thereon positionable in slots 62 in the housing 12 wherein the legs 60 frictionally engage the perimeter wall 18 of the housing 12. Additionally, or alternatively, a fastening member 63 may be attached to the housing 12 and engage the whistle 56. The fastening member 63 includes a plate 64 pivotally coupled to the housing 12 and having a flange 65 that cover a mouth opening 67 in the mouthpiece 57 when the fastening member 63 engages the whistle 56. A grip 66 is attached to the fastening member 63. The fastening member 63 is removable from the whistle 56 to facilitate usage of the whistle 56 and to remove it from the housing 12. The plate 64 includes a nub 68 positionable in the exhaust opening 58 to prevent debris from entering the whistle 56. Removal of the whistle 63 may allow access to the battery 30 as shown in FIG. 5, though the battery 30 may instead be in a separate compartment discrete from a body of the whistle 57.

A camera 69 may be mounted in the housing 12 and is directed forward of the front end 14. The camera 69 is a conventional digital camera configured to capture still images, video or both. The camera 69 is electrically coupled to the power supply 28. An electronic memory 70 is electrically coupled to the camera to store digital images or digital video captured by the camera 69. The electronic memory 70 may comprise a memory card port 71 mounted in the housing 12 and a memory card 72 mounted in the memory card port 71. Alternatively, the electronic memory 70 may comprise memory generally non-removable from the housing 12 and accessible by a data port mounted on the housing 12 and electrically coupled to the electronic memory 70. A camera actuator 73 is electrically coupled to the camera 69 and mounted on the housing 12. The camera 69 is actuated on to capture digital images or digital video when the camera actuator 73 is actuated.

In use, the assembly 10 is worn by a person when walking, for instance, at night and allows the person to easily carry and use the light emitter 26 when needed. In times of distress, the user may utilize the whistle 56 to signal assistance from others. The camera 69 may be used, when desired, to record an event which the user would like to preserve for future access.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A wearable safety light assembly configured to be positioned on fingers of a user, said assembly comprising:
a housing having a front end, a back end and a perimeter wall being attached to and extending between said front and back ends, said front end being open, said perimeter wall including a bottom side and a top side;
a light emitter being mounted in said housing and being directed outwardly through said front end, a power supply being mounted in said housing and being in electrical communication with said light emitter, a light actuator being mounted on said housing and being electrically coupled to said light emitter, said light actuator being actuated to turn said light emitter on or off;
a whistle being attached to said housing, wherein said whistle includes a mouthpiece extending rearwardly from said back end of said housing, wherein said whistle is removable from said housing;
a fastening member being attached to said housing and engaging said whistle; and
a finger mount being attached to said housing and being configured to engage one or two fingers of a person such that said housing is positioned on an upper side of the fingers, wherein said finger mount includes a coupler being attached to and extending upwardly from said finger mount, said coupler rotatably coupling said housing to said finger mount, wherein said finger mount includes a band including a central wall and a pair of lateral walls being attached to and extending downwardly from said central wall, each of said lateral walls being arcuate and curving toward each other to at least form a partial loop, said central wall having a break therein to define a first section and a second section of said central wall, said first and second sections being slidably coupled together to selectively alter a distance between said lateral walls;
a camera being mounted in said housing and being directed forward of said front end, said camera being electrically coupled to said power supply;
an electronic memory being electrically coupled to said camera to store digital images or digital video captured by said camera; and
a camera actuator being electrically coupled to said camera and mounted on said housing, said camera being actuated on to capture digital images or digital video when said camera actuator is actuated.

2. The wearable safety light assembly according to claim 1, wherein said housing has a length from said front end to said back end being less than 5.0 inches, said housing having a height and width each being less than 2.0 inches.

3. The wearable safety light assembly according to claim 1, wherein said light actuator is positioned on said top side.

4. The wearable safety light assembly according to claim 1, wherein said coupler comprises a ball mount releasably engaging said bottom side of said housing.

5. The wearable safety light assembly according to claim 1, wherein said fastening member covers a mouth opening in said mouthpiece when said fastening member engages said whistle, said fastening member being removable from said whistle to facilitate usage of said whistle.

6. The wearable safety light assembly according to claim 1, wherein said electronic memory comprises a memory card port mounted in said housing and a memory card mounted in said memory card port.

7. A wearable safety light assembly configured to be positioned on fingers of a user, said assembly comprising:
a housing having a front end, a back end and a perimeter wall being attached to and extending between said front and back ends, said front end being open, said perimeter wall including a bottom side and a top side, said housing having a length from said front end to said back end being less than 5.0 inches, said housing having a height and width each being less than 2.0 inches;

a light emitter being mounted in said housing and being directed outwardly through said front end, a power supply being mounted in said housing and being in electrical communication with said light emitter, a light actuator being mounted on said housing and being electrically coupled to said light emitter, said light actuator being actuated to turn said light emitter on or off, said light actuator being positioned on said top side;

a finger mount being attached to said housing and being configured to engage one or two fingers of a person such that said housing is positioned on an upper side of the fingers, a coupler being attached to and extending upwardly from said finger mount, said coupler rotatably coupling said housing to said finger mount, said coupler comprising a ball mount, said coupler releasably engaging said bottom side of said housing;

said finger mount including a band including a central wall and a pair of lateral walls being attached to and extending downwardly from said central wall, each of said lateral walls being arcuate and curving toward each other to at least form a partial loop, said central wall having a break therein to define a first section and a second section of said central wall, said first and second sections being slidably coupled together to selectively alter a distance between said lateral walls;

a whistle being attached to said housing, said whistle including a mouthpiece extending rearwardly from said back end of said housing, said whistle being removable from said housing;

a fastening member being attached to said housing and engaging said whistle, said fastening member covering a mouth opening in said mouthpiece when said fastening member engages said whistle, said fastening member being removable from said whistle to facilitate usage of said whistle;

a camera being mounted in said housing and being directed forward of said front end, said camera being electrically coupled to said power supply;

an electronic memory being electrically coupled to said camera to store digital images or digital video captured by said camera, said electronic memory comprising a memory card port mounted in said housing and a memory card mounted in said memory card port; and a camera actuator being electrically coupled to said camera and mounted on said housing, said camera being actuated on to capture digital images or digital video when said camera actuator is actuated.

\* \* \* \* \*